United States Patent [19]

Brown, Jr.

[11] 4,340,710

[45] Jul. 20, 1982

[54] ADDITION CURE COATING WITH IMPROVED ADHESION

[75] Inventor: Edgar D. Brown, Jr., Schenectady, N.Y.

[73] Assignee: General Electric Company, Waterford, N.Y.

[21] Appl. No.: 250,324

[22] Filed: Apr. 2, 1981

[51] Int. Cl.$^3$ .............................................. C08G 77/06
[52] U.S. Cl. ........................................ 528/15; 528/31; 528/32; 525/478; 428/429
[58] Field of Search ............................ 528/15, 31, 32; 525/478

[56] References Cited

U.S. PATENT DOCUMENTS

| 3,882,083 | 5/1975 | Berger et al. | 528/15 |
| 3,933,882 | 1/1976 | Lee et al. | 528/15 |
| 4,077,937 | 3/1978 | Sato et al. | 528/15 |

Primary Examiner—Melvyn I. Marquis
Attorney, Agent, or Firm—Michael J. Doyle

[57] ABSTRACT

There is provided a stable one-package silicone electronic junction coating composition comprised of a heat curable polyorganosiloxane composition which exhibits improved adhesion and catalyzed work-life and which is comprised of the reaction product of an olefinorganopolysiloxane, and an organohydrogenpolysiloxane, which is catalyzed by platinum metal and which is inhibited by a combination of agents comprised of ethylenically unsaturated isocyanurates and dialkylacetylenedicarboxylates.

9 Claims, No Drawings

ADDITION CURE COATING WITH IMPROVED ADHESION

FIELD OF THE INVENTION

The present invention is directed to platinum catalyzed addition cured polydiorganosiloxane coating compositions which exhibit improved adhesion to substrates and which utilize an inhibitor package comprised of a combination of triallylisocyanurate and dialkylacetylenedicarboxylate.

BACKGROUND OF THE INVENTION

Silicone compositions are well known products offering premium properties in a wide variety of applications. For example, certain flexible silicone resin systems have been found useful as electronic junction coatings which are used for passivating and protecting semiconductor surfaces, and serve to assure optimal electrical performance. Such silicone materials are chosen since they offer rapid cure rates which improve production efficiency. The low durometer of these materials helps to minimize the vibration and shock experienced by such semiconductor devices and the low viscosity of such silicone coating compositions provides for ease of handling.

Such silicone electronic junction coatings are useful in a number of applications. A flexible conformal coating of such material can provide mechanical and electrical insulation prior to molding of plastic power transistors, for example. These materials can also be used as a light pipe or lens which insulates and isolates LED's and photocouplers and may be utilized with or without further encapsulation. These silicone junction coating materials are also a resiliant coating which can be used directly over transistors, diodes and monolithic integrated circuit chips in order to prevent damage during and after final potting or sealing. Additionally, these coatings can be used as a thin section potting material for extra protection in cavity type packages in order to provide primary mechanical and chemical protection.

Heretofore, silicone electronic junction coating materials have ordinarily been two part or two package systems which when mixed provide a platinum catalyzed addition cure reaction system. Ordinarily the first package will contain a major amount of a vinyl functional linear siloxane fluid having a specified viscosity as will be described below, and an effective amount of a precious metal or platinum catalyst, as is well known in the art. Generally the second package will contain an additional amount of the vinyl functional siloxane fluid material in combination with a methyl hydgrogen siloxy functional silicone fluid. This methyl hydrogen siloxane functional fluid is ordinarily known as the crosslinking agent since it provides the hydrogen which adds to the doubly bonded vinyl group in the platinum catalyzed addition reaction in order to provide a tightly crosslinked and cured final product. Although the coating blend of parts 1 and 2 is ordinarily cured at elevated temperatures, such as, approximately 200° C., the two package system is nonetheless necessary since the blended material will begin to gel even at room temperature, and can become useless in as little as 24 hours. Therefore, there has been a widespread need for inhibitor compositions which will be effective for delaying the addition cure reaction for varied periods of time, depending upon the uses of the material. For example, an inhibitor can be useful even though a two part system is utilized in order to provide a useful, workable pot life for the catalyzed material after it is blended. Additionally, a search has been made for an effective inhibitor which would obviate the need for a two package system since it would be effective for inhibiting even the catalyzed blend of the previously discussed two part system. That is to say, it would be especially preferable if a one package electronic junction coating could be provided which contained an inhibitor composition which allowed for a sufficiently long shelf life yet would cure to an effective junction coating upon the application of an elevated temperature. One of the purposes of the present disclosure is to demonstrate that a particular combination of inhibitors has been found to be effective for such purposes when used together, and provide better results when either of the types of inhibitors is used separately.

Triallylisocyanurate has been utilized previously as an inhibitor in certain addition cure silicone systems. See, for example, U.S. Pat. No. 3,882,083 of Berger et al. which is hereby incorporated by reference which utilizes an ethylenically unsaturated isocyanurate inhibiting composition in a platinum catalyzed, room temperature vulcanizable (RTV) silicone composition. It has been found, however, that for the electronic junction coating compositions of the present invention the use of triallylisocyanurate alone provides an insufficiently long pot life, i.e. it becomes unworkable in too short a period of time.

On the other hand, dialkylacetylenedicarboxylates have been suggested as inhibitors in other types of platinum catalyzed silicone compositions such as the silicone release coatings of R. P. Eckberg disclosed in the copending application Ser. No. 250,479 filed Apr. 2, 1981, and which is hereby incorporated by reference. But, again it has been found that the use of such dialkylacetylenedicarboxylate inhibitors alone provides for unsatisfactory slow cure of such electronic junction coatings while at the same time being relatively expensive materials, and additionally requiring too great an increase in the silicone hydride crosslinking component in order to provide adequate cure of these coatings.

Additionally, not only has it been found that the dual inhibitor system described above provides excellent inhibiting properties in a platinum catalyzed addition cure electronic junction coating system, it has further been discovered that this dual system provides surprising adhesion promotion properties heretofore unavailable in such addition cure silicone systems. Certain heretofore known platinum catalyzed addition cure materials have had notoriously poor adhesion to substrates, and often adhesion promotors have been utilized to alleviate this deficiency. However, it has now been discovered that the combination of triallylisocyanurate and dialkylacetylenedicarboxylate not only provides effective inhibiting properties, but additionally provides for tenacous adherence of the silicone material to a coated substrate. Thus this improved adhesion is believed to be a fortuitous result of the search for effective inhibitors for such electronic junction coatings.

Thus it is an object of the present invention to provide one package silicone electronic junction coating compositions.

It is another object to provide a dual inhibitor system effective for prolonging the shelf life and work like of such junction coating compositions.

It is another object to provide junction coating compositions having improved adhesion to substrates.

These and other objects will become apparent to one skilled in the art upon consideration of the present specification and claims.

SUMMARY OF THE INVENTION

These and other objects are accomplished herein by providing an organpolysiloxane electronic junction coating composition comprising:

(a) an olefinorganopolysiloxane having structural units of the formula:

$$R_aR_b'SiO_{(4-a-b)/2} \tag{I}$$

and (b) an organohydrogenpolysiloxane having structural units of the formula:

$$R_aH_bSiO_{(4-a-b)/2} \tag{II}$$

wherein R is an organic radical attached to silicon by a C—Si linkage and is selected from the group consisting of monovalent hydrocarbon radicals, halogenated monovalent, hydrocarbon radicals, and cyanoalkyl radicals; generally, R contains from 1–30 carbon atoms, straight or branched chained, preferably from 1–12 carbon atoms, and most preferably 1–8 carbon atoms; R' is an olefinic hydrocarbon radical attached to silicon by a C—Si linkage and generally contains from 1–20 aliphatic carbons, straight or branch chained, and preferably 1–12 carbon atoms, linked by multiple bonds (e.g., vinyl, allyl, methallyl, butenyl, pentenyl, ethynyl and the like); a has a value of 0 to 3, inclusive, and preferably from 0.5 to about 2, inclusive, b has a value from 0.005 to 2.0, inclusive, and the sum of a and b e is equal to from 0.8 to 3, inclusive, (c) a platinum catalyst, and (d) a combination of inhibiting agents comprised of (i) an ethylenically unsaturated isocyanurate corresponding to the structural formula:

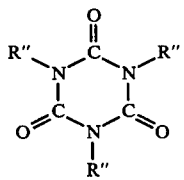

wherein R" is the same or different and is selected from the group consisting of hydrogen, lower alkyl, aryl, aralkyl, polynuclear aryl, heteroaryl, monofunctional lower-alkenyl and substituted derivatives thereof with the proviso that at least one R" is monofunctional lower-alkenyl; and (ii) a dialkylacetylenedicarboxylate which together are present in an amount sufficient to prevent premature gelation of the catalyzed junction coating composition but which will not prevent curing of the junction coating at elevated temperatures.

DESCRIPTION OF THE INVENTION

In particular, the olefinorganopolysiloxanes having structural units represented by Formula I hereinabove are intended to broadly cover fluid organopolysiloxanes which preferably, but not necessarily, are free of silanic hydrogen, and contain olefinic unsaturation by means of double or triple bonds between two adjacent aliphatic carbon atoms. Among the radicals which R represents in Formula I hereinabove are included alkyl, such as methyl, ethyl, propyl, isopropyl, butyl, octyl, dodecyl, and the like; cycloalkyl, such as cyclopentyl, cyclohexyl, cycloheptyl, and the like; aryl, such as phenyl, naphthyl, tolyl, xylyl, and the like; aralkyl, such as benzyl, phenylethyl, phenylpropyl, and the like; halogenated derivatives of the aforesaid radicals including chloromethyl, trifluoromethyl, chloropropyl, chlorophenyl, dibromophenyl, tetrachlorophenyl, difluorophenyl, and the like; cyanoalkyl, such as betacyano ethyl, gamma-cyanopropyl, beta-cyanopropyl and the like. Preferably R is methyl. Moreover, Formula I is intended to include those materials wherein R is a mixture of the aforesaid radicals.

Among the radicals represented by R' in Formula I hereinabove are included alkenyl, such as vinyl, allyl, methallyl, butenyl, pentenyl, and the like; and alkynyl, such as ethynyl, propynyl, butynyl, pentynyl and the like. Preferably R' is vinyl or allyl and most preferably R' is vinyl.

These olefinorganopolysiloxanes encompassed within the scope of Formula I hereinabove are well known in the art, as particularly manifested by U.S. Pat. No. 3,344,111 to Chalk and U.S. Pat. No. 3,436,366 to Modic, which are incorporated herein by reference. Similarly, their preparation and/or commercial availability is also well known.

Specific materials included within the scope of the olefinorganopolysiloxanes of Formula I hereinabove are low molecular weight materials, such as vinylpentamethyldisiloxane, 1,3-divinyltetramethyldisiloxane, 1,1,3-trivinyltrimethyldisiloxane, 1,1,1,3-tetravinyldimethyldisiloxane, as well as higher polymers containing up to 100,000 or more silicon atoms per molecule. Also included within the scope of the olefinorganopolysiloxanes of Formula I are cyclic materials containing silicon-bonded vinyl or allyl radicals, such as the cyclic trimer, tetramer or pentamer of methylvinylsiloxane $$((CH_2=CH-)CH_3SiO)$$

or methyl allylsiloxane $$((CH_2=CH-CH_2)(CH_3)SiO).$$

Among these cyclic materials, tetramethyltetrallylcyclotetrasiloxane and tetramethyltetravinylcyclotetrasiloxane are preferred.

The olefinorganopolysiloxanes encompassed within the scope of the present invention can be characterized as copolymers of (1) siloxane units having the formula:

$$(R_c)(R')_dSiO_{(4-c-d)/2} \tag{IV}$$

where R and R' are as defined above and c has a value of from 0 to 2, inclusive, and the sum of c and d is equal to from 1.0 to 3.0, inclusive, and (2) an organopolysiloxane having the structural formula:

$$(R)_nSiO_{(4-n)/2} \tag{V}$$

where R is as defined above and n has a value of from 0.8 to 2.5, inclusive. Thus, where the olefinorganopolysiloxane employed herein is a copolymer of units within the scope of formula IV with an organopolysiloxane having an average formula within the scope of formula V, the copolymer generally contains from 0.5 to 99.5 mole percent of units within the scope of Formula V. The preparation of these copolymers is also well known in the art.

A preferred class of organopolysiloxane compositions within the scope of the present invention are those disclosed by Modic in U.S. Pat. No. 3,436,366, incorporated herein by reference. These compositions comprise (1) 100 parts by weight of a liquid vinyl chainstopped polysiloxane having the formula:

$$CH_2=CH\underset{R^3}{\overset{R^3}{\underset{|}{\overset{|}{Si}}}}O\left(\underset{R^4}{\overset{R^4}{\underset{|}{\overset{|}{Si}}}}O\right)_n\underset{R^3}{\overset{R^3}{\underset{|}{\overset{|}{Si}}}}CH=CH_2$$

wherein $R^3$ and $R^4$ are monovalent hydrocarbon radicals free of aliphatic unsaturation, with at least 50 mole percent of the $R^4$ groups being methyl, and where n has a value such that the junction coating compositions of the present invention have a viscosity of, approximately, 500 to 5,000 centipoise at 25° C. and (2) from 20 to 50 parts by weight an organopolysiloxane copolymer comprising $(R^5)_3SiO_{0.5}$ units, where $R_5$ is a member selected from the class consisting of vinyl radicals and monovalent hydrocarbon radicals free of aliphatic unsaturation, where the ratio of $(R^5)_3SiO_{0.5}$ units to $SiO_2$ units is from about 0.5:1 to 1:1, and where from about 2.5 to 10 mole percent of the silicon atoms contain silicon-bonded vinyl groups. The vinyl chain-stopped organopolysiloxane component (1) is typified by various compositions where the monovalent hydrocarbon radicals represented by $R^3$ and $R^4$ include alkyl radicals, e.g., methyl, ethyl, propyl, butyl, octyl, etc.; aryl radicals, e.g., phenyl, tolyl, xylyl, etc.; cycloalkyl radicals, e.g., cyclohexyl, cycloheptyl, etc.; aralkyl radicals e.g., benzyl, phenylethyl, etc. Preferably, all of the radicals represented by $R^3$ and $R^4$ are selected from the group consisting of methyl and phenyl radicals and most preferably $R^3$ and $R^4$ are methyl. In the organopolysiloxane copolymer component (2) $R^5$ can be vinyl and/or monovalent hydrocarbon radicals free of aliphatic unsaturation, with at least the stated proportion of $R^5$ groups being vinyl. The $R^5$ groups which are not vinyl are of the same scope as the $R^3$ and $R^4$ groups and like these, are preferably methyl.

The organohydrogenpolysiloxanes having structural units represented by Formula II hereinabove are intended to broadly cover fluid organopolysiloxanes which are preferably, but not necessarily, free of olefinic unsaturation, but which contain silanic hydrogen. These organohydrogenpolysiloxanes represented by Formula II hereinabove are also known in the art as particularly manifested by U.S. Pat. No. 3,334,111 by Chalk, and U.S. Pat. No. 3,436,366, previously incorporated herein by reference.

Among the radicals represented by R in Formula II, hereinabove, similarly to R in Formula I hereinabove, are included alkyl, such as methyl, ethyl, propyl, isopropyl, butyl, octyl and the like; cycloalkyl, such as cyclopentyl, cyclohexyl, cycloheptyl and the like; aryl, such as phenyl, naphthyl, tolyl, xylyl, and the like, aralkyl, such as benzyl, phenylethyl, phenylpropyl, and the like; halogenated derivatives of the above radicals, including chloromethyl, trifluoromethyl, chloropropyl, chlorophenyl, dibromophenyl, tetrachlorophenyl, difluorophenyl and the like; cyanoalkyl, such as beta-cyanoethyl, gamma-cyanopropyl, beta-cyanopropyl and the like. Also intended to be included within the scope of Formula II are those materials where R is a mixture of the aforesaid radicals. Preferably the R group of Formula II is methyl.

Materials specifically encompassed within Formula II hereinabove, include 1,3-dimethyldisiloxane, 1,1,3,3-tetramethyldisiloxane, as well as higher polymers containing up to 100,000 or more silicon atoms per molecule. Also included within the scope of Formula II hereinabove are cyclic materials, such as cyclic polymers of methyl hydrogen siloxane having the formula:

$$(CH_3SiHO)_x$$

wherein x is a whole number equal to from 3 to 10 or more. Particularly included is tetramethylcyclotetrasiloxane.

The organohydrogenpolysiloxanes employed in the practice of the present invention can also be characterized as copolymers containing at least one unit per molecule having the formula:

$$(R_c)(H)_dSiO_{(4-c-d)/2} \qquad (VI)$$

with the remaining siloxane units in the organopolysiloxane being within the scope of Formula V hereinabove, where R, c, d and n are defined above.

Within the scope of Formula VI are siloxane units, such as hydrogen siloxane units $(H_2SiO)_{1.5}$, methyl hydrogen siloxane units $(HSiCH_3O)$, dimethyl hydrogen siloxane units, and dihydrogen siloxane units $(H_2SiO)$. In these copolymers, the siloxane units of Formula V and VI are present in proportions so as to form a hydrogenpolysiloxane within the scope of Formula II hereinabove. In general, these copolymers contain from 0.5 to 99.5 mole percent of the siloxane units of Formula VI.

The platinum catalyst component employed in the compositions of the present invention includes all of the well known platinum catalysts which are effective for catalyzing the reaction between silicon-bonded hydrogen groups and silicon-bonded olefinic groups. These materials include, for example, finely divided elemental platinum catalysts, such as those described in U.S. Pat. No. 2,970,150 to Bailey, the chloroplatinic acid catalysts described in U.S. Pat. No. 2,823,218 to Speier, the platinum hydrocarbon complexes shown in U.S. Pat. No. 3,159,601 to Ashby and U.S. Pat. No. 3,159,662 to Ashby, as well as the platinum alcoholate catalysts described in U.S. Pat. No. 3,220,972 to Lamoreaux. Moreover, the platinum chloride-olefin complexes described in U.S. Pat. No. 3,516,946 to Modic are also used herein. All of the aforesaid U.S. Patents are intended to be incorporated herein by reference.

The ethylenically unsaturated isocyanurates of Formula III hereinabove in combination with the dialkylacetylenedicarboxylates described below provide the organopolysiloxane compositions of the present invention with desirable latent curing properties as well as unexpectedly improved adhesion to substrates. Thus, as a result of their presence, the organopolysiloxane compositions of the present invention are inhibited to premature geltation, i.e., room temperature curing, and therefore can be stored for extended periods of time, for example about two years, and subsequently cured with the application of heat without loss of desired hardness or surface properties to the final cured product.

Referring to Formula III hereinabove, which represents the ethylenically unsaturated isocyanurate cure inhibitors within the scope of the present invention, R" may be the same or different and is selected from the group consisting of hydrogen, alkyl, aryl, aralkyl, polynuclear aryl, heteroaryl, monofunctional lower-alkenyl, and non-interfering substituted derivatives thereof, with the proviso that at least one R" is monofunctional lower-alkenyl. Alkyl and substituted alkyl are intended to include one to about 20 carbon atoms, straight or branch chained, and include, for example, methyl ethyl chloroethyl, cyanopropyl, propyl, isopropyl, butyl, dibromobutyl, isobutyl, pentyl, hexyl, dodecyl and the like. By aryl, aralkyl, polynuclear aryl, heteroaryl and non-interfering substituted derivatives thereof is intended to include phenyl, chlorophenyl, dibromophenyl, naphthyl, benzyl, pyridyl, cyanophenyl, tolyl, xylyl, phenanthyl and the like. By non-interfering substituted derivatives is meant those functionalities that do not render the platinum catalysts completely ineffective. Monofunctional lower-alkenyl is intended to include two to about six carbon atoms, straight or branch chained, containing one carbon to carbon double bond, and includes, for example, vinyl, allyl, butenyl, isobutenyl, pentenyl, hexenyl, and the like. Preferably, at least one R" is allyl and most preferably all three R" groups are allyl.

Specific materials within the scope of Formula III are, for example, triallylisocyanurate, diallylisocyanurate, diallylethylisocyanurate, tributenylisocyanurate and diallylphenylisocyanurate. Triallylisocyanurate and diallylisocyanurate are preferred. Triallylisocyanurate is the most preferred.

The ethylenically unsaturated isocyanaurates represented by Formula III hereinabove are either commercially available or are conveniently prepared. Included among the procedures for their preparation known in the art is the reaction of the appropriate organic halide or mixture of the appropriate organic halides with potassium isocyanate in any dipolar, aprotic solvent medium, such as N,N-dimethyl formamide (DMF), dimethylsulfoxide (DMSO), hexamethylphosphorus triamide (HMPA) and the like. Illustrated pictorially and using allyl chloride, for example, as the appropriate organic halide this reaction is represented in the following manner:

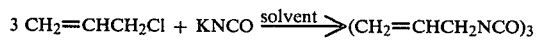

The temperature for this reaction can range from ambient to about 150° C. Similarly, trimethallylisocyanurate, tributyenylisocyanurate, triisobutenylisocyanurate, diallylethylisocyanurate, allyldiethylisocyanurate, diallylbenzylisocyanurate and the like are prepared by using the appropriate alkenyl halide or mixture of alkenyl halide and alkyl halide and/or aralkyl halide in the above reaction scheme.

Diallylisocyanurate and triallylisocyanurate are commercially available from the Allied Chemical Company.

The other inhibitors utilized by the present invention are dialkylacetylenedicarboxylates which result from the diesterification reaction of 2-butynoic dicarboxylic acid with two equivalents of alcohols such as methanol, ethanol, butanol, benzylic alcohol, allyl alcohol or mixtures of such alcohols. Such reactions can be represented as:

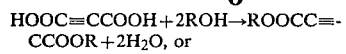

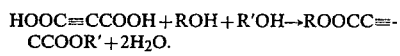

Useful diesters prepared in this fashion include dimethylacetylenedicarboxylate, diethylacetylenedicarboxylate, dibutylacetylenedicarboxylate, methylbutylacetylenedicarboxylate, methylethylacetylenedicarboxylate, etc. Particularly useful for the practice of the present invention are those diesters where R represents methyl or ethyl groups. The proportions of the various ingredients employed in the compositions of the present invention can vary within wide limits. The proportions of the ingredients are affected by the stoichiometry of the addition reactants involved since many of the final products prepared from the compositions of the invention exhibit satisfactory properties for intended purposes even when the final product contains unreacted silicon-bonded olefinic radicals or unreacted silicon-hydrogen linkages. For economic and commercial purposes it is generally preferred that the olefinorganopolysiloxane and the organohydrogenpolysiloxane be present in such proportions that the composition contains from about 0.005 to 20 silicone-hydrogen linkages per silicon-bonded olefin radical. However, it is often most desirable to have an equal number of silicon-hydrogen linkages and olefin groups in the composition so as to produce a final product which is substantially free of either silicon-hydrogen linkages or silicon-bonded olefin radicals.

Regardless of the type of platinum catalyst employed, it is generally present in an amount sufficient to cause the co-reaction of the olefinorganopolysiloxane and the organohydrogenpolysiloxane. Thus, satisfactory results may be obtained when the platinum catalyst is present in amounts sufficient to provide as little as one atom of platinum per million silicon-bonded olefin radicals in the olefinorgaopolysiloxane. On the other hand, amounts of the platinum catalyst sufficient to provide as high as one to 10 platinum atoms per 1,000 silicon-bonded olefin radicals may also be used. In general, however, it is preferred to employ the platinum catalyst in an amount sufficient to provide one platinum atom per one thousand to one million silicon-bonded olefin radicals in the olefinorganopolysiloxane ingredient. Ordinarily, approximately 5 to 50 parts platinum metal per million parts olefinorganopolysiloxane will be sufficient to initiate the necessary co-reaction.

The amount of the ethylenically unsaturated isocyanurate and the dialkylacetylenedicarboxylate employed in the practice of the present invention also varies within wide limits depending upon various conditions. These conditions are, for example, the amount of platinum catalyst used, the particular olefinorganopolysiloxane and organohydrogenpolysiloxane employed, and also the degree of cure inhibition desired. Generally, however, these materials are present in an amount sufficient to inhibit premature gelation, i.e., cure at room temperature, but insufficient to prevent cure at elevated temperature. More particularly, the ethylenically unsaturated isocyanurate compound of this invention may be present in an amount in the range of from about 0.01 to about 5 weight percent of the total composition, and preferably from about 0.5 to about 2 weight percent of the total composition. Similarly the dialkylacetyledicarboxylate constituent may be present in an amount in the range of 0.05 to 2.0 weight percent of the total composition and preferably from about 0.1 to 1.0 weight percent of the total composition.

The latent addition curable organopolysiloxane junction coating compositions of the present invention can be prepared by mixing, in any suitable fashion, all of the components described hereinabove, in a one-package system. As a result of the latent curing ability of the present compositions, these premixed compositions can be stored as such and kept at ambient room temperature for extended periods of time until ready to be used. Thus, they provide extended work life without concern for premature gelling.

In general, the compositions of the present invention are cured at elevated temperatures in the range of from about 70° C. to 150° C. Complete cure time generally ranges from about one-half hour to about five hours. Of course, these and other details concerning the curing of the compositions of this invention depend upon their particular composition and application and are within the knowledge of those skilled in the art.

EXAMPLE 1

Base Fluid A which is useful as a component in one-package electronic junction coating compositions which will be described in subsequent examples is provided by combining 75 parts by weight linear dimethylvinyl chainstopped polydimethylsiloxane fluid (vinyl fluid stock) having a viscosity of, approximately, 3000 to 4000 centipoise at 25° C., 25 parts by weight of a copolymer of trimethylsiloxane units, $SiO_2$ units and methylvinylsiloxane units, wherein there were approximately 0.8 trimethylsiloxane units per $SiO_2$ unit and approximately 7.0 mole percent of the silicon atoms were present as methylvinylsiloxane units and the remaining silicon atoms were present as a portion of the trimethylsiloxane or $SiO_2$ units. This material is in the nature of a vinyl MQD resin. It is to be noted that the 25 parts by weight of this resin can be incorporated into Base Fluid A in the form of, approximately, 41.7 parts of a 60% silicone resin solids by weight solution in xylene. Base Fluid A additionally contains sufficient platinum catalyst to provide approximately 10 parts platinum metal per million parts of Base Fluid A. The platinum utilized was platinum complexed with methylvinyltetramer as taught in U.S. Pat. Nos. 3,715,334 and 3,814,730 (Karstedt) which is hereby incorporated by reference. Also included in Base Fluid A is 2000 ppm of tetramethyl-tetravinyl-cyclotetrasiloxane.

EXAMPLE 2

A one-package electronic junction coating composition was provided by combining 100 parts by weight of the platinum catalyzed vinyl functional siloxane Base Fluid A provided in Example 1, 0.5 parts by weight of triallylisocyanurate, 0.25 parts by weight of dimethylacetylenedicarboxylate, 36.2 additional parts by weight of the same vinyl fluid stock utilized in Example 1, and 63.8 parts by weight of a low viscosity (approximately 10 centistokes) liquid copolymer of dimethylhydrogensiloxane units and $SiO_2$ units containing an average of two dimethylhydrogensiloxane units per $SiO_2$ as a crosslinking agent. The mixed composition may be deaerated under vacuum for electronic applications. ASTM test slabs of the coating composition were cured at approximately 150° C. for one hour. The cured composition exhibited the following physical properties:

| Hardness | 32 shore |
|---|---|
| Tensile | 407 psi |
| Elongation | 190% |
| Gel Time | 233 hours at 75° C. |

Thus not only did this one-package composition exhibit suitable catalyzed work-life, it also exhibited the physical properties necessary for electronic junction coating materials. By way of comparison, previously known two-package junction coating materials (which do not contain the combination of cyanurate and alkylacetylenedicarboxylate) would have a first package comprised of similar proportions of platinum and vinyl functional materials as described in Example 1, whereas the second package would contain the methyl hydrogen crosslinking agent and additional vinyl stock fluid in approximately reversed proportions as that utilized in the one-package composition of this example. It has been found the inclusion of relatively greater amounts of the methyl hydrogen functional crosslinker will provide one-package junction coatings having improved tensile strength compared to the conventional two-package junction coatings which might, for example, have a tensile strength of, approximately, 300 psi.

EXAMPLE 3

Another comparative one-package junction coating composition was prepared by combining 100 parts by weight of Base Fluid A from Example 1 with one percent by weight of triallylsiocyanurate but without any dialkylacetylenedicarboxylate. The remainder of the composition was comprised of 30.3 parts by weight of the dimethylvinyl polysiloxane fluid and 69.7 parts by weight of the methyl hydrogen polysiloxane component. Cured ASTM test slabs of this junction coating exhibited the following physical properties:

| Hardness | 38 shore |
|---|---|
| Tensile | 498 psi |
| Elongation | 176% |
| Gel Time | 4½ hours at 75° C. |

Thus it can be seen that a junction coating which does not contain a combination of triallyisocyanurate and dialkylacetylenedicarboxylate failed to provide satisfactory catalyzed pot-life compared to the junction coating material of Example 2.

EXAMPLE 4

Another less satisfactory one-package electronic junction coating composition was prepared by combining 100 parts by weight of Base Fluid A, with 0.5 parts by weight dimethylacetylenedicarboxylate but no triallylisocyanurate was utilized. Additionally this coating composition contained 43.8 parts by weight of the dimethylvinyl chainstopped fluid and 56.2 parts by weight of the methylhydrogen siloxane fluid used previously. Cured ASTM test slabs of this material exhibited the following physical properties:

| Hardness | 29 shore |
|---|---|
| Tensile | 200 psi |
| Elongation | 170% |
| Gel Time | 112 hours at |

| -continued |
|---|
| 75° C. |

Although this composition was an improvement over the composition of Example 3, it is readily apparent that the electronic junction coating composition of Example 2 which utilized a combination of triallylisocyanurate and dialkylacetylenedicarboxylate exhibited the most satisfactory combination of physical properties.

What is claimed as new and desired to be secured by Letters Patent of the United States is:

1. A latent curable electronic junction coating composition stabilized against premature gelation comprising:

a. an olefinorganopolysiloxane having units of the structural formula:

$$R_aR'_bSiO_{(4-a-b)/2}$$

b. an organohydrogenpolysiloxane having units of the structural formula:

$$R_aSiH_bSiO_{(4-a-b)/2}$$

wherein R is selected from the group consisting of a monovalent hydrocarbon radical, a halogenated monovalent hydrocarbon radical, a cyanoalkyl radical and mixtures thereof, R' is an olefinic hydrocarbon radical, wherein a has a value of from 0 to 3, inclusive, b has a value of from 0.0005 to 2.0, inclusive, and the sum of a and b is equal to from 0.8 to 3, inclusive, c. a sufficient amount of a pltinum catalyst to cause the co-reaction of (a) and (b); and d. a combination of inhibiting agents comprised of (i) an ethylenically unsaturated isocyanurate corresponding to the structural formula:

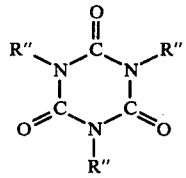

wherein R" is the same or different and is selected from the group consisting of hydrogen, alkyl, aryl, aralkyl polynuclear aryl, heteroaryl, monofunctional lower-alkenyl and the non-interfering substituted derivatives thereof with the proviso that at least one R" is lower-alkyl and (ii) a dialkylacetylenedicarboxylate having the structural formula:

$$ROOCC≡CCOOR$$

wherein R is as described above and wherein said combination of ethylenically unsaturated isocyanurate and said dialkylacetylenedicarboxylate is present in an amount sufficient to inhibit premature gelation but insufficient to prevent cure at elevated temperature.

2. A composition as in claim 1 wherein said olefinorganopolysiloxane is comprised essentially of a linear dimethylvinyl chainstopped polydimethylsiloxane fluid having a viscosity of, approximately, 500 to 5000 centipoise at 25° C.

3. A composition as in claim 1 wherein said organohydrogen polysiloxane is comprised essentially of units selected from the group consisting of $(H_2SiO)_{1.5}$ units, $(H\ SiCH_3O)$ units, $(CH_3)_2H\ SiO_{0.5}$ units and $(H_2SiO)$ units.

4. A composition as in claim 1 wherein said platinum catalyst is present in an amount sufficient to provide, approximately, 1 to 50 parts platinum metal per million parts of said olefinorganopolysiloxane.

5. A composition as in claim 1 wherein said ethylenically unsaturated isocyanurate is triallylisocyanurate.

6. A composition as in claim 1 wherein said dialkylacetylenedicarboxylate is dimethylacetylenedicarboxylate.

7. A composition as in claim 1 wherein there is present, approximately, 0.01 to 5.0 percent by weight of said ethylenically unsaturated isocyanurate based upon the total weight of said junction coating composition.

8. A composition as in claim 1 wherein said dialkylacetylenedicarboxylate is present in an amount of, approximately, 0.05 to 2.0 weight percent of said junction coating composition.

9. A composition as in claim 1 which has been cured at elevated temperature upon a substrate.

* * * * *